(12) United States Patent
Wang et al.

(10) Patent No.: US 11,533,657 B2
(45) Date of Patent: Dec. 20, 2022

(54) ACKNOWLEDGMENT PACKET TRANSMISSION METHOD AND COMMUNICATIONS DEVICE

(71) Applicant: Huawei Technologies Co., Ltd., Shenzhen (CN)

(72) Inventors: Weiguang Wang, Nanjing (CN); Feng Li, Nanjing (CN); Xingwang Zhou, Nanjing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 73 days.

(21) Appl. No.: 17/162,556

(22) Filed: Jan. 29, 2021

(65) Prior Publication Data

US 2021/0153075 A1 May 20, 2021

Related U.S. Application Data

(63) Continuation of application No. PCT/CN2019/107177, filed on Sep. 23, 2019.

(30) Foreign Application Priority Data

Sep. 27, 2018 (CN) .......................... 201811134342.7

(51) Int. Cl.
*H04W 28/04* (2009.01)
*H04L 1/16* (2006.01)
*H04L 1/18* (2006.01)

(52) U.S. Cl.
CPC ........... *H04W 28/04* (2013.01); *H04L 1/1607* (2013.01); *H04L 1/1809* (2013.01)

(58) Field of Classification Search
CPC . H04W 28/14; H04W 28/0278; H04W 28/02; H04W 28/0289; H04W 28/0226;
(Continued)

(56) References Cited

U.S. PATENT DOCUMENTS 7,436,778 B1 10/2008 Iannaccone et al.
9,112,814 B2 8/2015 Adachi et al.
(Continued)

FOREIGN PATENT DOCUMENTS

CN 1645787 A 7/2005
CN 1859072 A 11/2006
(Continued)

OTHER PUBLICATIONS

DARPA, "Transmission Control Protocol, DARPA Internet Program, Protocol Specification", RFC: 793, Sep. 1981, 89 pages.
(Continued)

*Primary Examiner* — Phong La
(74) *Attorney, Agent, or Firm* — Slater Matsil, LLP

(57) ABSTRACT

This application provides an acknowledgment packet transmission method and a communications device. The method includes: receiving, by a first device, data sent by a second device; sending, by the first device, the acknowledgment packet to the second device, where the acknowledgment packet includes an acknowledgment field, the acknowledgment field carries data lengths of K groups of data packets, and the data lengths vary with a data amount included in each group of data packets received/lost by the first device.

20 Claims, 8 Drawing Sheets

(58) Field of Classification Search
CPC ......... H04W 28/0231; H04W 28/0273; H04W 72/12; H04W 36/22; H04L 1/1607; H04L 1/16; H04L 1/1809; H04L 1/1664; H04L 1/18; H04L 1/08; H04L 1/1685; H04L 1/1671; H04L 1/1628; H04L 1/1642; H04L 1/1657; H04L 1/1635
See application file for complete search history.

(56) References Cited

U.S. PATENT DOCUMENTS

| | | | | |
|---|---|---|---|---|
| 2014/0195797 | A1* | 7/2014 | du Toit | H04L 63/168 |
| | | | | 713/152 |
| 2014/0369338 | A1* | 12/2014 | Grandhi | H04W 28/0268 |
| | | | | 370/338 |
| 2016/0219458 | A1* | 7/2016 | Kubota | H04L 1/1896 |
| 2017/0171723 | A1* | 6/2017 | Adachi | H04W 16/28 |
| 2018/0199361 | A1* | 7/2018 | Zhang | H04L 5/0033 |
| 2019/0281655 | A1* | 9/2019 | Kim | H04L 1/1848 |
| 2021/0153075 | A1* | 5/2021 | Wang | H04L 1/1628 |

FOREIGN PATENT DOCUMENTS

| | | | | |
|---|---|---|---|---|
| CN | 101247209 A | | 8/2008 | |
| CN | 102104468 A | | 6/2011 | |
| CN | 104518852 A | | 4/2015 | |
| CN | 106161583 A | * | 11/2016 | ............... H04L 1/16 |
| CN | 107734547 A | * | 2/2018 | |
| CN | 107734547 A | | 2/2018 | |
| CN | 109076391 A | * | 12/2018 | ........... H04L 1/1614 |
| CN | 108141325 B | * | 1/2021 | ........... H04L 1/1685 |
| WO | 2006015334 A1 | | 2/2006 | |
| WO | 2011019427 A2 | | 2/2011 | |
| WO | WO-2017162008 A1 | * | 9/2017 | ........... H04L 1/1607 |
| WO | 2018127238 A1 | | 7/2018 | |

OTHER PUBLICATIONS

Mathis, M. et al., "TCP Selective Acknowledgment Options", RFC2018, Oct. 1996, 12 pages.

Floyd, S. et al., "An Extension to the Selective Acknowledgment (SACK) Option for TCP", RFC2883, Jul. 2000, 17 pages.

* cited by examiner

| | | | | | | |
|---|---|---|---|---|---|---|
| Another method | Type: 5 | Length: 10 | Sequence number of a start byte: 22946821 | Sequence number of an end byte: 23012521 | | 10 bytes in total |
| | 1 byte | 1 byte | 4 bytes | 4 bytes | | |
| This application | Type: * | Total quantity of consecutive data sequence ranges: 1 | Size of a consecutive data sequence range: 7 | Sequence number of a start byte: 22946821 | Data length: 65700 | 9 bytes in total |
| | 1 byte | 1 byte | 1 byte | 4 bytes | 3 bytes | |
| Another method | Type: 5 | Length: 10 | Sequence number of a start byte: 40628881 | Sequence number of an end byte: 40658081 | Sequence number of a start byte: 40599681 | Sequence number of an end byte: 40624501 | 18 bytes in total |
| | 1 byte | 1 byte | 4 bytes | 4 bytes | 4 bytes | 4 bytes |
| This application | Type: * | Total quantity of consecutive data sequence ranges: 2 | Size of a consecutive data sequence range: 6 | Sequence number of a start byte: 40628881 | Data length: 65700 | Sequence number of a start byte: 40599681 | Data length: 24800 | 14 bytes in total |
| | 1 byte | 1 byte | 1 byte | 4 bytes | 2 bytes | 4 bytes | 2 bytes |

FIG. 6

ACKNOWLEDGMENT PACKET TRANSMISSION METHOD AND COMMUNICATIONS DEVICE

CROSS-REFERENCE TO RELATED APPLICATIONS

This application is a continuation of International Application No. PCT/CN2019/107177, filed on Sep. 23, 2019, which claims priority to Chinese Patent Application No. 201811134342.7, filed on Sep. 27, 2018. The disclosures of the aforementioned applications are hereby incorporated by reference in their entireties.

TECHNICAL FIELD

This application relates to the communications field, and more specifically, to an acknowledgment packet transmission method and a communications device.

BACKGROUND

A reliable transport protocol (for example, a transmission control protocol (TCP)) generally includes a packet acknowledgment mechanism, to feed back information indicating that a data packet has been successfully received by a receive end, or to assist a transmit end in performing retransmission of a lost packet. Reliable data transmission in a network is ensured based on the reliable transport protocol by using the following rules.

(1) According to the reliable transport protocol, a sequence number is allocated to each data packet, so that the data packets from the transmit end to the receive end are sequentially received based on the sequence numbers. After receiving the data packet, the receive end generates and sends an acknowledgment packet (ACK) that includes the corresponding sequence number (which may be referred to as an acknowledgment sequence number), to indicate that the corresponding data packet has been successfully received by the receive end.

(2) If the transmit end does not receive the acknowledgment packet from the receive end within a reasonable time, the transmit end assumes that the data packet has been lost, and triggers a data packet retransmission mechanism.

In the above process, how the acknowledgment packet is used in the reliable transport protocol for acknowledgment of arrival of the data packet and for assistance of retransmission completion. However, because the acknowledgment packet includes only the acknowledgment sequence number, when the receive end performs packet retransmission by using the acknowledgment packet, a problem that data packets to be retransmitted cannot be specified occurs.

(1) Only a data packet that is not received within the reasonable time is retransmitted. When data packets that are sent after the data packet that is not received within the reasonable time can be all normally received, retransmission efficiency can be improved in this retransmission manner. However, when a large quantity of data packets are lost, the transmit end needs to wait each data packet for the reasonable time one after another, and then continuously perform packet retransmission, which greatly wastes time and bandwidth.

(2) A data packet that is not received within the reasonable time and all data packets that are sent after this data packet are retransmitted. When all the data packets that are sent after the data packet that is not received within the reasonable time are lost, retransmission efficiency is very high by using this retransmission method. However, if only the data packet that is not received within the reasonable time is lost, sever traffic waste is caused when all the data packets after this data packet are retransmitted.

Therefore, the problem that data packets to be retransmitted cannot be specified needs to be urgently resolved.

SUMMARY

This application provides an acknowledgment packet transmission method and a communications device, to specify a data packet that needs to be retransmitted, thereby reducing resource waste.

According to a first aspect, this application provides an acknowledgment packet transmission method. The method includes: receiving, by a first device, data sent by a second device, where the data includes N data packets; and sending, by the first device, an acknowledgment packet to the second device, where the acknowledgment packet includes an acknowledgment field, the acknowledgment field includes a first field and a second field, the second field includes K locations and K lengths, an $i^{th}$ location in the K locations is a location of a start byte or a location of an end byte of an $i^{th}$ group of data packets in K groups of data packets, an $i^{th}$ length in the K lengths is a length of the $i^{th}$ group of data packets in the K groups of data packets, each group of data packets in the K groups of data packets include one data packet or a plurality of consecutive data packets, each group of data packets include one data packet or a plurality of consecutive data packets that belong to the N data packets, $i=1, \ldots, K$, and the first field is used to indicate a value of K.

In the foregoing technical solution, the acknowledgment field is added to the acknowledgment packet to specify a data packet that the second device needs to retransmit, thereby reducing resource waste.

In addition, in the foregoing technical solution, in the acknowledgment field, a start location or an end location, and a length are used to indicate a group of data packets, and the data length changes with a volume of data included in each group of data packets received by/lost for the first device, so that the first device can dynamically adjust, based on a data length of each group of data packets, a quantity of bytes occupied to indicate the group of data packets. In this way, the acknowledgment packet occupies relatively small space, thereby improving broadband usage.

In a possible implementation, the start location is a sequence number of a start data packet or a sequence number of a start byte, and the end location is a sequence number of an end data packet or a sequence number of an end byte.

In the foregoing technical solution, a location is indicated by using a sequence number of a data packet or a sequence number of a byte, which is easy to implement.

In a possible implementation, the length is a sequence number offset relative to the start data packet or the end data packet, or a sequence number offset relative to the start byte or the end byte.

In the foregoing technical solution, with reference to the start location or the end location, an offset is used to indicate a group of data packets. In this way, a problem of a relatively large value of a data length caused because a sequence number continuously accumulates can be avoided. Therefore, the acknowledgment packet occupies relatively small space, thereby improving broadband usage.

In a possible implementation, the first field includes the value of K.

In the foregoing technical solution, the first field carries the value of K, and the first field may be used to directly instruct the second device to read content of the acknowledgment field, so that the second device correctly parses the acknowledgment packet.

In a possible implementation, the first field includes a first byte quantity, and the first byte quantity is a quantity of bytes occupied by the acknowledgment field.

In the foregoing technical solution, the first field carries the first byte quantity, and the first field may be used to indirectly instruct the second device to read content of the acknowledgment field, so that the second device correctly parses the acknowledgment packet.

In a possible implementation, the first field further includes a second byte quantity, and the second byte quantity is a quantity of bytes occupied to indicate the length.

In the foregoing technical solution, the second byte quantity changes with the quantity of bytes occupied to indicate the length, and a quantity of bytes occupied to indicate a group of data packets may be dynamically adjusted, to instruct the second device to correctly parse the acknowledgment packet.

In a possible implementation, the first field further includes a second byte quantity, and the second byte quantity is a quantity of bytes occupied to indicate both the location and the length. In the foregoing technical solution, the second device can correctly parse the acknowledgment packet.

In a possible implementation, the quantity of bytes occupied to indicate the length of the group of data packets is a quantity of bytes occupied to indicate a maximum length of the K lengths.

In the foregoing technical solution, the quantity of bytes occupied to indicate the length of the group of data packets is the quantity of bytes occupied to indicate the maximum length of the K lengths. In this way, space occupied by the acknowledgment packet can be reduced while it is ensured to correctly indicate any group of data packets.

In a possible implementation, the acknowledgment field further includes a third field, and the third field is used to indicate a type of the acknowledgment field.

In the foregoing technical solution, the third field is used to indicate the type of the acknowledgment field, so that the second device can determine a method for parsing the acknowledgment packet and then correctly parse the acknowledgment packet.

In a possible implementation, the K groups of data packets are data packets that are successfully received.

In the foregoing technical solution, a data packet that has been successfully received is indicated to the second device, which indirectly indicates, to the second device, a data packet that needs to be retransmitted. In this way, the data packet that needs to be retransmitted can be specified, thereby reducing resource waste.

In a possible implementation, the K groups of data packets are data packets that are not successfully received.

In the foregoing technical solution, a data packet that is not successfully received is indicated to the second device, which directly indicates, to the second device, a data packet that needs to be retransmitted. In this way, the data packet that needs to be retransmitted can be specified, thereby reducing resource waste.

According to a second aspect, this application provides an acknowledgment packet transmission method. The method includes: sending, by a second device, data to a first device, where the data includes N data packets; and receiving, by the second device, an acknowledgment packet sent by the first device, where the acknowledgment packet includes an acknowledgment field, the acknowledgment field includes a first field and a second field, the second field includes K locations and K lengths, an $i^{th}$ location in the K locations is a start location or an end location of an $i^{th}$ group of data packets in K groups of data packets, an $i^{th}$ length in the K lengths is a length of the $i^{th}$ group of data packets in the K groups of data packets, each group of data packets in the K groups of data packets include one data packet or a plurality of consecutive data packets, each group of data packets include one data packet or a plurality of consecutive data packets that belong to the N data packets, i=1, . . . , K, and the first field is used to indicate a value of K.

In the foregoing technical solution, the acknowledgment field is added to the acknowledgment packet to specify a data packet that the second device needs to retransmit, thereby reducing resource waste.

In addition, in the foregoing technical solution, in the acknowledgment field, a start location or an end location, and a length are used to indicate a group of data packets, and the data length changes with a volume of data included in each group of data packets received by/lost for the first device, so that the first device can dynamically adjust, based on a data length of each group of data packets, a quantity of bytes occupied to indicate the group of data packets. In this way, the acknowledgment packet occupies relatively small space, thereby improving broadband usage.

In a possible implementation, the start location is a sequence number of a start data packet or a sequence number of a start byte, and the end location is a sequence number of an end data packet or a sequence number of an end byte.

In the foregoing technical solution, a location is indicated by using a sequence number of a data packet or a sequence number of a byte, which is easy to implement.

In a possible implementation, the length is a sequence number offset relative to the start data packet or the end data packet, or a sequence number offset relative to the start byte or the end byte.

In the foregoing technical solution, with reference to the start location or the end location, an offset is used to indicate a group of data packets. In this way, a problem of a relatively large value of a data length caused because a sequence number continuously accumulates can be avoided. Therefore, the acknowledgment packet occupies relatively small space, thereby improving broadband usage.

In a possible implementation, the first field includes the value of K.

In the foregoing technical solution, the first field carries the value of K, and the first field may be used to directly instruct the second device to read content of the acknowledgment field, so that the second device correctly parses the acknowledgment packet.

In a possible implementation, the first field includes a first byte quantity, and the first byte quantity is a quantity of bytes occupied by the acknowledgment field.

In the foregoing technical solution, the first field carries the first byte quantity, and the first field may be used to indirectly instruct the second device to read content of the acknowledgment field, so that the second device correctly parses the acknowledgment packet.

In a possible implementation, the first field further includes a second byte quantity, and the second byte quantity is a quantity of bytes occupied to indicate the length.

In the foregoing technical solution, the second byte quantity changes with the quantity of bytes occupied to indicate the length, and a quantity of bytes occupied to indicate a group of data packets may be dynamically adjusted, to instruct the second device to correctly parse the acknowledgment packet.

In a possible implementation, the first field further includes a second byte quantity, and the second byte quantity is a quantity of bytes occupied to indicate both the location and the length. In the foregoing technical solution, the second device can correctly parse the acknowledgment packet.

In a possible implementation, the quantity of bytes occupied to indicate the length of the group of data packets is a quantity of bytes occupied to indicate a maximum length of the K lengths.

In the foregoing technical solution, the quantity of bytes occupied to indicate the length of the group of data packets is the quantity of bytes occupied to indicate the maximum length of the K lengths. In this way, space occupied by the acknowledgment packet can be reduced while it is ensured to correctly indicate any group of data packets.

In a possible implementation, the acknowledgment field further includes a third field, and the third field is used to indicate a type of the acknowledgment field.

In the foregoing technical solution, the third field is used to indicate the type of the acknowledgment field, so that the second device can determine a method for parsing the acknowledgment packet and then correctly parse the acknowledgment packet.

In a possible implementation, the K groups of data packets are data packets that are successfully received.

In the foregoing technical solution, a data packet that has been successfully received is indicated to the second device, which indirectly indicates, to the second device, a data packet that needs to be retransmitted. In this way, the data packet that needs to be retransmitted can be specified, thereby reducing resource waste.

In a possible implementation, the K groups of data packets are data packets that are not successfully received.

In the foregoing technical solution, a data packet that is not successfully received is indicated to the second device, which directly indicates, to the second device, a data packet that needs to be retransmitted. In this way, the data packet that needs to be retransmitted can be specified, thereby reducing resource waste.

According to a third aspect, this application provides a communications device, including modules configured to perform the method according to the first aspect or any implementation of the first aspect.

According to a fourth aspect, this application provides a communications device, including modules configured to perform the method according to the second aspect or any implementation of the second aspect.

According to a fifth aspect, this application provides a chip, including a processor and a transceiver. The chip is configured to perform the method according to the first aspect or any implementation of the first aspect.

According to a sixth aspect, this application provides a chip, including a processor and a transceiver. The chip is configured to perform the method according to the second aspect or any implementation of the second aspect.

According to a seventh aspect, this application provides a communications device, including a processor and a transceiver. The communications device is configured to perform the method according to the first aspect or any implementation of the first aspect.

According to an eighth aspect, this application provides a communications device, including a processor and a transceiver. The communications device is configured to perform the method according to the second aspect or any implementation of the second aspect.

According to a ninth aspect, this application provides a computer readable storage medium, including an instruction. When the instruction is run on a communications device, the communications device is enabled to perform the method according to the first aspect or any implementation of the first aspect.

According to a tenth aspect, this application provides a computer readable storage medium, including an instruction. When the instruction is run on a communications device, the communications device is enabled to perform the method according to the second aspect or any implementation of the second aspect.

According to an eleventh aspect, this application provides a computer program product. When the computer program product is run on a communications device, the communications device is enabled to perform the method according to the first aspect or any implementation of the first aspect.

According to a twelfth aspect, this application provides a computer program product. When the computer program product is run on a communications device, the communications device is enabled to perform the method according to the second aspect or any implementation of the second aspect.

BRIEF DESCRIPTION OF THE DRAWINGS

FIG. 6 shows two examples of respectively using the method according to an embodiment of this application and another method;

DETAILED DESCRIPTION OF ILLUSTRATIVE EMBODIMENTS

The following describes technical solutions of this application with reference to the accompanying drawings.

This application may be applied to various scenarios in which a reliable transport protocol is applied, for example, various scenarios in which the TCP is applied. This application may also be applied to another scenario, provided that in this scenario, a device at one end needs to indicate, to a device at another end, a packet that needs to be retransmitted, and the device at the another end performs parsing in a manner and retransmits the packet according to the indication of the device at the end, for example, various scenarios of UDP in which an acknowledgment mechanism is added.

A type of a communications device is not specifically limited in this application. For example, the communications device may be a communications device that uses a reliable transport protocol. The communications device that uses the reliable transport protocol may be a computer, a mobile phone, a tablet computer, or the like.

For easy understanding of the solutions in the embodiments of this application, the following first describes concepts and related technologies related to this application.

Figure 1:
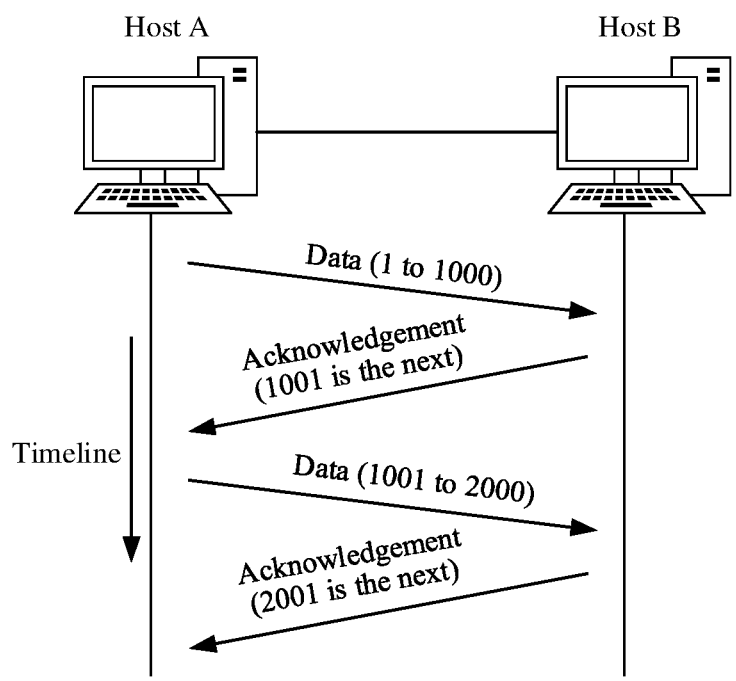
FIG. 1 is a schematic diagram of an acknowledgment packet mechanism in a TCP.

An acknowledgment packet (ACK): The acknowledgment packet is described by using an acknowledgment packet mechanism in the TCP as an example. FIG. 1 is a schematic diagram of the acknowledgment packet mechanism in the TCP. As shown in FIG. 1, when data is sent from a host A to a host B, the host B returns an acknowledgment to the host A. For example, in FIG. 1, the host A sends, to the host B, data packets whose sequence numbers are 1 to 1000. After successfully receiving the data packets whose sequence numbers are 1 to 1000, the host B sends, to the host A, an acknowledgment that includes an acknowledgment sequence number 1001, that is, an acknowledgment packet, to indicate that a next data packet whose sequence number is 1001 is expected. After parsing the acknowledgment, the host A sends, to the host B, data packets whose sequence numbers are 1001 to 2000. This case applies to the following processes. If the host A does not receive, within a reasonable time, an acknowledgment packet sent by the host B, the host A assumes that the data packet has been lost, and triggers a data packet retransmission mechanism.

Figure 2:
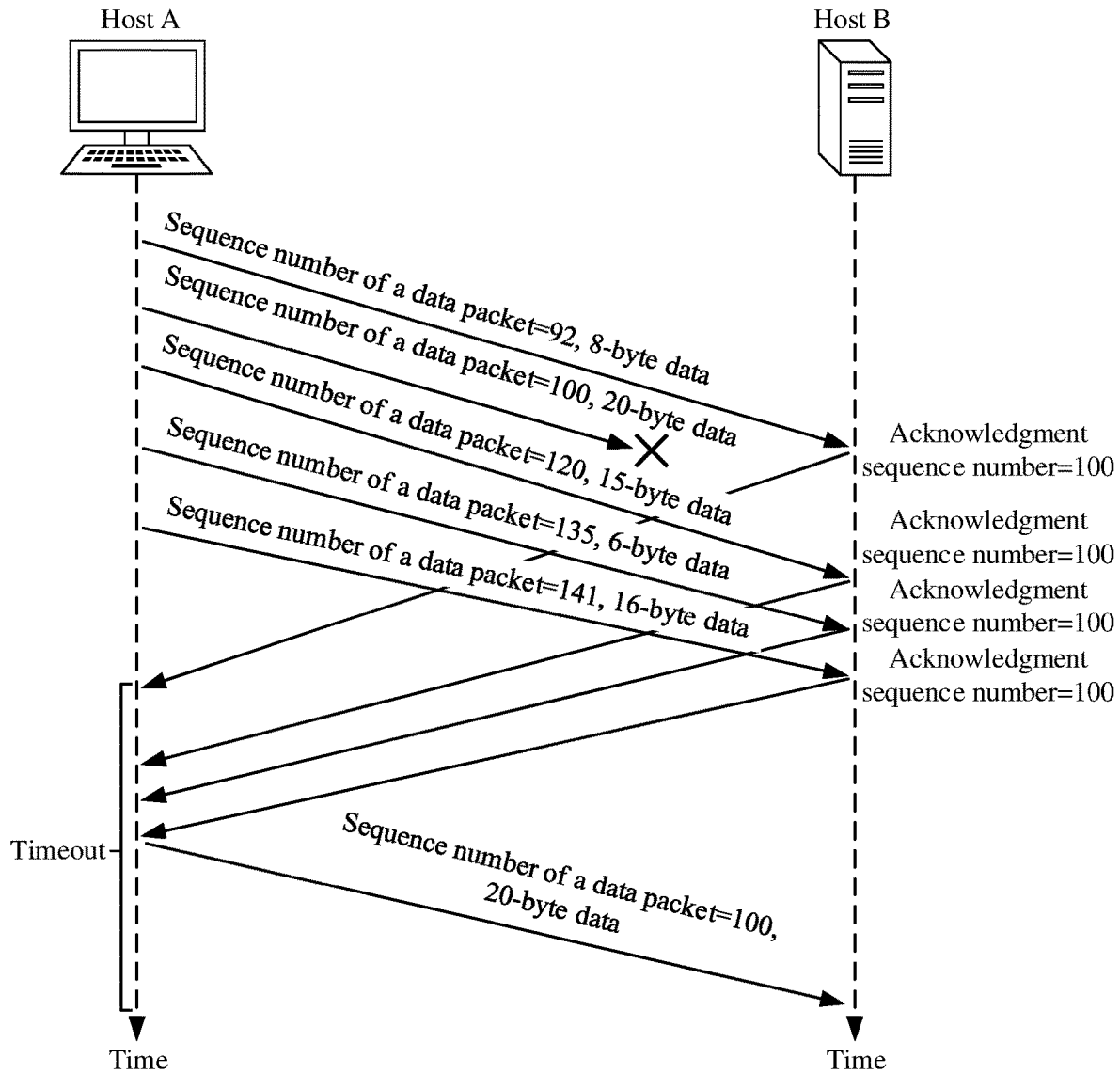
FIG. 2 is a schematic diagram of a packet retransmission mechanism in a TCP.

Packet retransmission: The packet retransmission is described by using a packet retransmission mechanism in the TCP as an example. FIG. 2 is a schematic diagram of the packet retransmission mechanism in the TCP. As shown in FIG. 2, when a host A continuously receives three acknowledgment packets whose acknowledgment sequence numbers are all 100, the host A determines that the data packet whose sequence number is 100 is lost in a transmission process, and performs retransmission of the lost packet.

However, for the host A, there is a problem of determining whether to retransmit only the data packet whose sequence number is 100 or to retransmit data packets whose sequence numbers are 120, 135, and 141 that are sent after the data packet whose sequence number is 100.

If only the data packet whose sequence number is 100 is retransmitted, when the data packets whose sequence numbers are 120, 135, and 141 are successfully transmitted, retransmission efficiency can be improved. However, when the data packets whose sequence numbers are 120, 135, and 141 are also lost, the host A needs to wait, for the reasonable time one after another, each of the data packets whose sequence numbers are 120, 135, and 141, before performing packet retransmission, which greatly wastes time and bandwidth.

If the data packet whose sequence number is 100 and the data packets whose sequence numbers are 120, 135, and 141 and that are sent after the data packet are all retransmitted, when the data packets whose sequence numbers are 120, 135, and 141 are all lost, retransmission efficiency can be improved. However, when only the data packet whose sequence number is 100 is lost, traffic is severely wasted.

Therefore, no matter whether to retransmit only a data packet that is not received within a specified time or to retransmit a data packet that is not received within a specified time and all data packets sent after this data packet, transmission resources are severely wasted in some cases.

This application provides an acknowledgment packet transmission method, to specify a data packet that needs to be retransmitted, thereby reducing resource waste.

Figure 3:
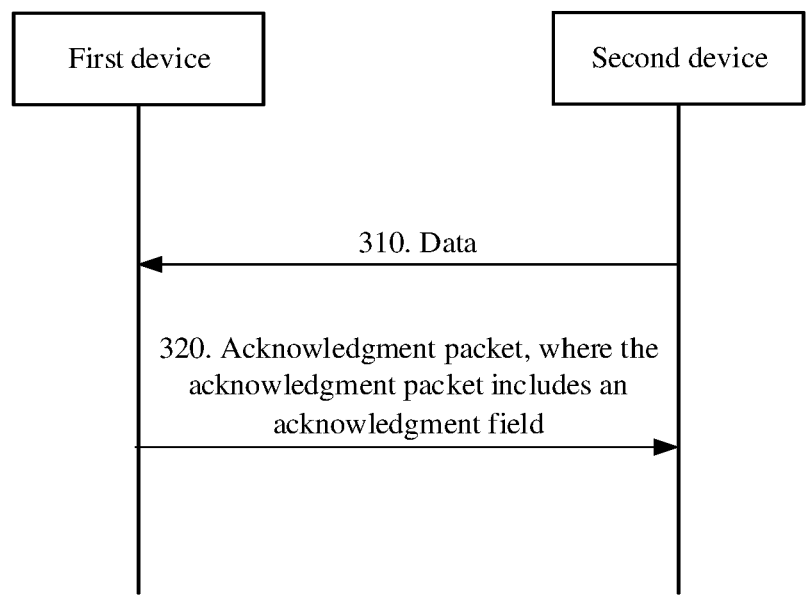
FIG. 3 is a schematic flowchart of an acknowledgment packet transmission method according to an embodiment of this application.

FIG. 3 is a schematic flowchart of an acknowledgment packet transmission method according to an embodiment of this application. The method shown in FIG. 3 includes at least a part of the following content.

310. A second device sends data to a first device. The data includes N data packets.

320. The first device sends an acknowledgment packet to the second device. The acknowledgment packet includes an acknowledgment field. The acknowledgment field includes a first field and a second field. The second field includes K locations and K lengths. An $i^{th}$ location in the K locations is a start location or an end location of an $i^{th}$ group of data packets in K groups of data packets. An $i^{th}$ length in the K lengths is a length of the $i^{th}$ group of data packets in the K groups of data packets. Each group of data packets in the K groups of data packets include one data packet or a plurality of consecutive data packets. Each group of data packets include one data packet or a plurality of consecutive data packets that belong to the N data packets. Herein, i=1, . . . , K. The first field is used to indicate a value of K.

A type of the first device and a type of the second device are not specifically limited in this embodiment of this application. The first device may be any device that supports a reliable transport protocol or an acknowledgment mechanism, for example, a computer, a mobile phone, or a tablet computer.

It should be understood that when the first device successfully receives all the data packets, the acknowledgment packet may not have the acknowledgment field.

In the foregoing technical solution, the acknowledgment field is added to the acknowledgment packet to specify a data packet that the second device needs to retransmit, thereby reducing resource waste.

In addition, in the foregoing technical solution, in the acknowledgment field, a start location or an end location, and a length are used to indicate a group of data packets, and the length changes with a volume of data included in each group of data packets received by/lost for the first device, so that the first device can dynamically adjust, based on a length of each group of data packets, a quantity of bytes occupied to indicate the group of data packets. In this way, the acknowledgment packet occupies relatively small space, thereby improving broadband usage.

The following separately describes 310 and 320.

In 310, the second device sends the data to the first device. The data includes the N data packets.

The first device receives the N data packets. It should be understood that the first device may successfully receive all the N data packets, or may successfully receive only some of the N data packets.

Each data packet may consist of data with a plurality of bytes.

In 320, the first device sends the acknowledgment packet to the second device. The acknowledgment packet includes the acknowledgment field. The acknowledgment field includes the first field and the second field. The second field includes K sequence numbers and the K lengths. An $i^{th}$ sequence number in the K sequence numbers is a start location or an end location of the $i^{th}$ group of data packets in the K groups of data packets. The $i^{th}$ length in the K lengths is the length of the $i^{th}$ group of data packets in the K groups of data packets. Each group of data packets in the K groups of data packets include one data packet or a plurality of consecutive data packets. Each group of data packets include one data packet or a plurality of consecutive data packets that belong to the N data packets. Herein, i=1, . . . , K. The first field is used to indicate the value of K.

The second device receives and parses the acknowledgment packet sent by the first device, and then retransmits a data packet based on content in the acknowledgment packet.

The first device indicates, by using the acknowledgment packet, the data packet that the second device needs to retransmit.

There may be the following two cases of the data packet that needs to be retransmitted.

Case 1:
a single data packet, for example, a number 4 data packet.

Case 2:
a plurality of consecutive data packets, for example, number 4 to number 7 data packets.

Specifically, the first device indicates, by using the acknowledgment field in the acknowledgment packet, the data packet that the second device needs to retransmit.

Optionally, the acknowledgment field may be located in a reserved field of a reliable transport protocol packet.

Figure 4:
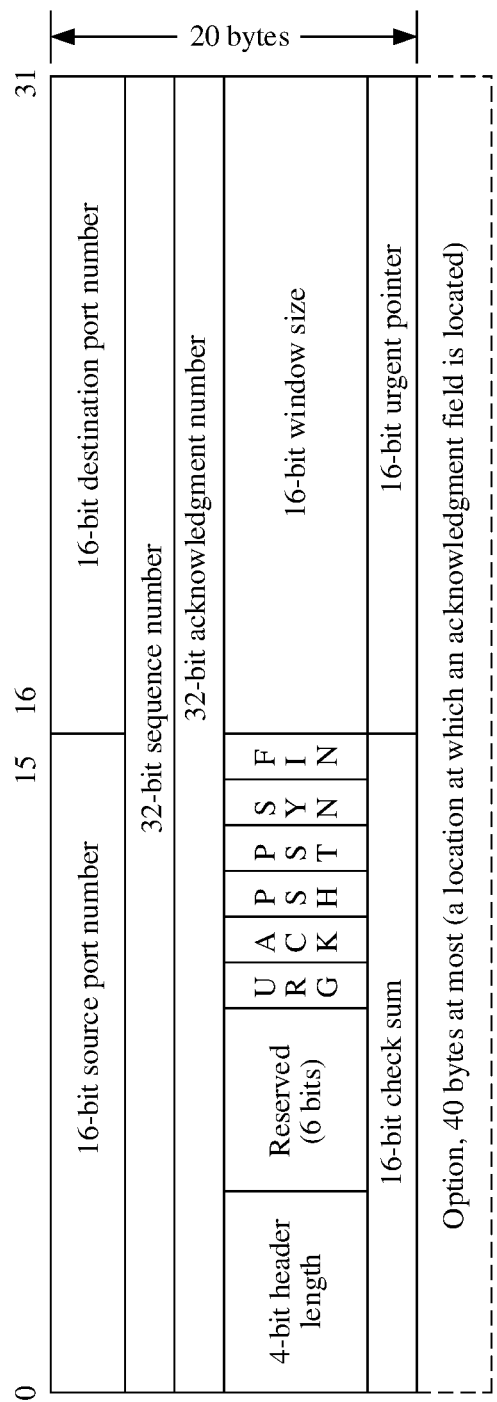
FIG. 4 is a schematic diagram of a location of an option field in an acknowledgment packet in a TCP.

For example, for the TCP, the acknowledgment field may be located in an option field of a TCP acknowledgment packet, as shown in FIG. 4.

Optionally, the acknowledgment field may be a field newly added to a reliable transport protocol packet.

More specifically, the first device indicates, by using the second field in the acknowledgment field, the data packet that the second device needs to retransmit.

In this embodiment of this application, K start locations or K end locations of the K groups of data packets, and K lengths are used to indicate the K groups of data packets. The K groups of data packets may be data packets that are successfully received, or may be data packets that are not successfully received.

Optionally, the start location may be indicated by using a sequence number of a start data packet in a group of data packets, the end location may be indicated by using a sequence number of an end data packet in a group of data packets, and the length may be a sequence number offset relative to the start data packet or the end data packet (in this case, the data packets may be consecutively numbered, for example, a number 4 data packet, a number 5 data packet, and a number 6 data packet). In other words, the group of data packets are indicated by using the sequence number of the start data packet or the sequence number of the end data packet in the group of data packets, and the sequence number offset relative to the start data packet or the end data packet. For example, when a group of data packets include number 4 to number 9 data packets, the group of data packets may be represented as (4, 5) or (9, 5); and when a group of data packets include a number 4 data packet, the group of data packets may be represented as (4, 0).

Optionally, the start location may be indicated by using a sequence number of a start byte in a group of data packets, the end location may be indicated by using a sequence number of an end byte in a group of data packets, and the length may be a sequence number offset relative to the start byte or the end byte. In other words, the group of data packets are indicated by using the sequence number of the start byte or the sequence number of the end byte in the group of data packets, and the sequence number offset relative to the start byte or the end byte. For example, when a group of data packets include two consecutive data packets: a number 101 data packet and a number 151 data packet, and a data length of each of the two data packets is 50, the group of data packets may be represented as (101, 99) or (200, 99); and when a group of data packets include a number 101 data packet, and a data length of the number 101 data packet is 50, the group of data packets may be represented as (101, 49) or (150, 49).

In the foregoing technical solution, the location is indicated by using a sequence number of a data packet or a sequence number of a byte, which is easy to implement. With reference to the start location or the end location, an offset is used to indicate a group of data packets. In this way, a problem of a relatively large value of a data length caused because a sequence number continuously accumulates can be avoided. Therefore, the acknowledgment packet occupies relatively small space, thereby improving broadband usage.

Optionally, the start location may be indicated by using a sequence number of a start data packet in a group of data packets, the end location may be indicated by using a sequence number of an end data packet in a group of data packets, and the length may be a quantity of data packets in the group of data packets. In other words, the group of data packets are indicated by using the sequence number of the start data packet or the sequence number of the end data packet in the group of data packets, and the quantity of data packets in the group of data packets. For example, when a group of data packets include number 4 to number 9 data packets, the group of data packets may be represented as (4, 6) or (9, 6); and when a group of data packets include a number 4 data packet, the group of data packets may be represented as (4, 1).

Optionally, the start location may be indicated by using a sequence number of a start byte in a group of data packets, the end location may be indicated by using a sequence number of an end byte in a group of data packets, and the length may be a quantity of bytes in the group of data packets. In other words, the group of data packets are indicated by using the sequence number of the start data packet or the sequence number of the end data packet in the group of data packets, and the quantity of bytes in the group of data packets. For example, when a group of data packets include two consecutive data packets: a number 101 data packet and a number 151 data packet, and a data length of each of the two data packets is 50, the group of data packets may be represented as (101, 100) or (200, 100); and when a group of data packets include a number 101 data packet, and a data length of the number 101 data packet is 50, the group of data packets may be represented as (101, 50) or (150, 50).

In the foregoing technical solution, the location is indicated by using a sequence number of a data packet or a sequence number of a byte, which is easy to implement. With reference to the start location or the end location, a quantity of data packets or a quantity of bytes is used to indicate a group of data packets. In this way, a problem of a relatively large value of a data length caused because a sequence number continuously accumulates can be avoided. Therefore, the acknowledgment packet occupies relatively small space, thereby improving broadband usage.

In the foregoing technical solution, when the data packets are consecutively numbered, the second device may store a sequence number of a corresponding byte in each data packet and a sequence number offset, to find a sequence number of a corresponding byte based on a sequence number of a data packet.

The start location in this embodiment of this application may alternatively be a sequence number of a start data segment, a sequence number of a start data packet, a sequence number of a start bit (bit), a number of a start frame in a data frame used to transmit a group of data packets, a number of a start subframe in a data frame used to transmit a group of data packets, or a group number of a start group in groups with any possible sizes that are obtained through grouping the data sent by the second device to the first device.

The end location in this embodiment of this application may alternatively be a sequence number of an end data segment, a sequence number of an end data packet, a sequence number of an end bit (bit), a number of an end frame in a data frame used to transmit a group of data packets, a number of an end subframe in a data frame used to transmit a group of data packets, or a group number of an end group in groups with any possible sizes that are obtained through grouping the data sent by the second device to the first device.

The length in this embodiment of this application may alternatively be a sequence number offset relative to a start data segment or an end data segment, a sequence number offset relative to a start data packet or an end data packet, a sequence number offset relative to a start bit or an end bit, an offset relative to a number of a start frame or an end frame, a number offset relative to a start subframe or an end subframe, or a group number offset relative to a start group or an end group; or may be a quantity of data segments, a quantity of data packets, a quantity of bits, a quantity of frames, a quantity of subframes, a quantity of groups, or the like.

In another possible implementation, a sequence number of a start byte and a sequence number of an end byte may be used to indicate a single data packet or a group of consecutive data packets.

For example, when a number 101 data packet has a data length of 50, the number 101 data packet is represented as (101, 150) by using a sequence number of a start byte and a sequence number of an end byte; and when two consecutive data packets are respectively a number 101 data packet and a number 151 data packet, a data length of the number 101 data packet is 50, and a data length of the number 102 data packet is also 50, the two data packets are represented as (101, 200) by using a sequence number of a start byte and a sequence number of an end byte.

The sequence number of the start byte and the sequence number of the end byte are used to indicate a single data packet or a group of consecutive data packets. In this application, the start location or the end location, and the length are used to indicate a single data packet or a group of consecutive data packets. When the above two manners are compared, relatively small space can be occupied in the latter manner (a relatively small quantity of bytes may be used for indication because a value is relative small), thereby saving resources.

In addition, in this application, the start location or the end location, and the length are used to indicate a single data packet or a group of consecutive data packets. In addition, a data length of each group of data packets may be further dynamically adjusted to indicate a quantity of bytes required for indication of the group of data packets, thereby further reducing space occupied by the acknowledgment packet.

Optionally, the second field includes the K locations and the K lengths. One location and one length may indicate a single data packet or a group of consecutive data packets in the foregoing. It can be learned that the second field may indicate K single data packets, or K groups of consecutive data packets, or K total quantity K of: single data packets and a plurality of consecutive data packets. Herein, K is an integer greater than or equal to 1.

Herein, the K single data packets, the K groups of consecutive data packets, or the total quantity K of: the single data packets and the plurality of consecutive data packets correspond to the K groups of data packets.

Optionally, an $i^{th}$ length in a second byte is determined based on a data length of the $i^{th}$ group of data packets.

For example, when the data length of the $i^{th}$ group of data packets is less than or equal to 256, the data length of the $i^{th}$ group of data packets occupies 1 byte, and the $i^{th}$ length is 1; when the data length of the $i^{th}$ group of data packets is greater than 256 and is less than or equal to 65535, the data length of the $i^{th}$ group of data packets occupies 2 bytes, and the $i^{th}$ length is 2; when the data length of the $i^{th}$ group of data packets is greater than 65535, the data length of the $i^{th}$ group of data packets occupies 3 bytes, and the $i^{th}$ length is 3; and so on.

In the foregoing technical solution, in this embodiment of this application, space occupied to indicate a data length may be dynamically adjusted based on a data length of a data packet that needs to be retransmitted, thereby avoiding space waste.

The first device indicates the value of K by using the first field in the acknowledgment field. Herein, the value of K is a quantity of: single data packets and a plurality of consecutive data packets that may be indicated by using the second field, and K is an integer greater than or equal to 1.

Optionally, the first field includes the value of K.

In other words, the first field carries the value of K to indicate the value of K to the second device.

For example, when the first device and the second device have agreed on a quantity of bytes occupied to indicate one location and a quantity of bytes occupied to indicate one length, the acknowledgment packet needs to carry only the value of K to instruct the second device to correctly parse content of the acknowledgment field. Specifically, for example, when the first device and the second device have agreed on 4 bytes occupied to indicate one location and 2 bytes occupied to indicate one length, the value of K carried in the acknowledgment field is 2.

In the foregoing technical solution, the first field carries the value of K, and the first field may be used to directly instruct the second device to read the content of the acknowledgment field, so that the second device correctly parses the acknowledgment packet.

Optionally, the first field includes the value of K and a second byte quantity. The second byte quantity is a quantity of bytes occupied to indicate one length.

For example, when the first device and the second device have agreed on a quantity of bytes occupied to indicate one location, the acknowledgment packet can carry the value of K and the second byte quantity to instruct the second device to correctly parse the content of the acknowledgment field. Specifically, for example, when the first device and the second device have agreed on 4 bytes occupied to indicate one location, the value of K carried in the acknowledgment field is 2, and the second byte quantity is 2.

In the foregoing technical solution, the first field carries the value of K, and the first field can be used to directly instruct the second device to read the content of the acknowledgment field. The second byte quantity changes with a quantity of bytes occupied to indicate the length, and the second byte quantity can be dynamically adjusted to indicate a quantity of bytes occupied to indicate one group of data packets, to instruct the second device to correctly parse the acknowledgment packet.

Optionally, the first field includes the value of K and a second byte quantity. The second byte quantity is a quantity of bytes occupied to indicate both the location and the length.

For example, when the first device and the second device have agreed on a quantity of bytes occupied to indicate one location, the acknowledgment packet can carry the value of K and the second byte quantity to instruct the second device to correctly parse the content of the acknowledgment field. Specifically, for example, when the first device and the second device have agreed on 4 bytes occupied to indicate one location and 2 bytes occupied to indicate one length, the value of K carried in the acknowledgment field is 6.

In the foregoing technical solution, the first field carries the value of K, and the first field can be used to directly instruct the second device to read the content of the acknowledgment field. The second byte quantity changes with a quantity of bytes occupied to indicate the length, and the second byte quantity can be dynamically adjusted to indicate a quantity of bytes occupied to indicate one group of data packets, to instruct the second device to correctly parse the acknowledgment packet.

Optionally, the first field includes a first byte quantity. The first byte quantity indicates a quantity of bytes occupied by the acknowledgment field.

For example, when the first device and the second device have agreed on a quantity of bytes occupied to indicate one location and a quantity of bytes occupied to indicate a length, the acknowledgment packet needs to carry only the first byte quantity, and the second device can correctly parse the content of the acknowledgment field through only simple calculation. Specifically, for example, when the first device and the second device have agreed on 4 bytes occupied to indicate one location and 2 bytes occupied to indicate one length, the first byte quantity carried in the acknowledgment field is 8.

In the foregoing technical solution, the first field carries the first byte quantity, and the first field may be used to indirectly instruct the second device to read the content of the acknowledgment field, so that the second device correctly parses the acknowledgment packet.

Optionally, the first field includes a first byte quantity and a second byte quantity. The second byte quantity is a quantity of bytes occupied to indicate one length.

For example, when the first device and the second device have agreed on a quantity of bytes occupied to indicate a location, the acknowledgment packet carries the first byte quantity and the second byte quantity, and the second device can correctly parse content of the acknowledgment field through only simple calculation. Specifically, for example, when the first device and the second device have agreed on 4 bytes occupied to indicate one location, the first byte quantity carried in the acknowledgment field is 8, and the second byte quantity is 2.

In the foregoing technical solution, the second byte quantity changes with the quantity of bytes occupied to indicate the length, and a quantity of bytes occupied to indicate a group of data packets may be dynamically adjusted, to instruct the second device to correctly parse the acknowledgment packet.

In addition, in the foregoing technical solution, the value of K may be further dynamically adjusted based on a data length of a data packet that needs to be retransmitted, thereby enhancing expression capability.

Optionally, the first field includes a first byte quantity and a second byte quantity. The second byte quantity is a quantity of bytes occupied to indicate both one location and one length.

For example, when the first device and the second device have agreed on a quantity of bytes occupied to indicate a location, the acknowledgment packet carries the first byte quantity and the second byte quantity, and the second device can correctly parse the content of the acknowledgment field through only simple calculation. Specifically, for example, when the first device and the second device have agreed on 4 bytes occupied to indicate one location, the first byte quantity carried in the acknowledgment field is 8, and the second byte quantity is 6.

In the foregoing technical solution, the second byte quantity changes with the quantity of bytes occupied to indicate the length, and a quantity of bytes occupied to indicate a group of data packets may be dynamically adjusted, to instruct the second device to correctly parse the acknowledgment packet.

In addition, in the foregoing technical solution, the value of K may be further dynamically adjusted based on a data length of a data packet that needs to be retransmitted, thereby enhancing expression capability.

It should be understood that, in the foregoing technical solution, locations and lengths of the K groups of data packets all use a same quantity of bytes for expression. For example, the locations of the K groups of data packets are all expressed by using 4 bytes, and the lengths of the K groups of data packets are all expressed by using 2 bytes.

Optionally, the acknowledgment field includes an end identifier to indicate an end of the acknowledgment field. In this case, the second device can correctly parse the acknowledgment field as long as the second device learns of the quantity of bytes occupied to indicate one location and one length. The quantity of bytes occupied to indicate one location and one length may be agreed on in advance, or may be notified to the second device by using the acknowledgment packet. It should be understood that the acknowledgment packet may not have the first field when the quantity of bytes occupied to indicate one location and one length is agreed on in advance.

It should be understood that, in this embodiment of this application, when the second field is constructed, space in the second field used for expressing groups of data packets is the same. In this way, the following case may be avoided: the second device mistakenly parses the content of the acknowledgment field because different occupied space.

Optionally, the value of K can be determined based on the second byte quantity.

For example, the acknowledgment field is located in a TCP option field. The TCP option field includes 40 bytes at most. If the second byte quantity is 6, the value of K is 6 at most.

In the foregoing technical solution, according to this embodiment of this application, the value of K may be further dynamically adjusted based on a data length of a data packet that needs to be retransmitted, thereby enhancing expression capability.

Optionally, the quantity of bytes occupied to indicate the length of the group of data packets is a quantity of bytes occupied to indicate a maximum length of K lengths.

For example, when the value of K is 3, it actually indicates that: a location of a first group of data packets needs 4 bytes, a length of the first group of data packets needs 1 byte, and 5 bytes in total are occupied; it actually indicates that: a location of a second group of data packets needs 4 bytes, a length of the second group of data packets needs 2 bytes, and 6 bytes in total are occupied; it actually indicates that: a location of a third group of data packets needs 4 bytes, a length of the third group of data packets needs 3 bytes, and 7 bytes in total are occupied. The lengths of the first to the third groups are all expressed by using 3 bytes. Therefore, the second byte quantity is 7. In addition, when the acknowledgment packet is constructed, the locations and lengths of the first to the third groups of data packets are all indicated by using 7 bytes.

In the foregoing technical solution, the quantity of bytes occupied to indicate the length of the group of data packets is the quantity of bytes occupied to indicate the maximum length of the K lengths. In this way, space occupied by the acknowledgment packet can be further reduced while it is ensured to correctly indicate any group of data packets.

Optionally, the acknowledgment field further includes a third field. The third field is used to indicate a type of the acknowledgment field.

For example, the third field carries a type number of the acknowledgment field.

In the foregoing technical solution, the third field is used to indicate the type of the acknowledgment field, so that the second device can determine a method for parsing the acknowledgment field and then correctly parse the acknowledgment field.

Optionally, the acknowledgment packet further includes an acknowledgment sequence number. The acknowledgment sequence number is used to indicate a sequence number of a next expected data packet of the second device or a maximum sequence number of a data packet that has been successfully received by the first device.

Optionally, the first device generates the acknowledgment packet. The first device generates the acknowledgment packet by using the following two methods.

Method 1

The first device generates an acknowledgment packet based on M successfully received data packets. Herein, M is less than N.

In this case, the K groups of data packets are data packets that are successfully received, and an acknowledgment sequence number is a sequence number of a next expected data packet of the second device.

Optionally, the first device may not determine data that is not successfully received, and the second device determines the data that is not successfully sent.

For example, the first device uses the acknowledgment packet to indicate, to the second device, the data that has been successfully received by the first device; and the second device determines, based on the successfully received data, data that needs to be retransmitted, that is, the data that is not successfully transmitted by the second device, or the data that is not successfully received by the first device.

In the foregoing technical solution, a data packet that has been successfully received is indicated to the second device, which indirectly indicates, to the second device, a data packet that needs to be retransmitted. In this way, the data packet that needs to be retransmitted can be specified, thereby reducing resource waste.

Method 2:

The first device determines, based on M successfully received data packets, N-M data packets that are not successfully received, and then generates the acknowledgment packet based on K locations and K lengths of data packets in the N-M data packets that are not successfully received.

In this case, the K groups of data packets are data packets that are not successfully received, and an acknowledgment sequence number is a maximum sequence number of data packets that have been successfully received by the first device.

In the foregoing technical solution, a data packet that is not successfully received is indicated to the second device, which directly indicates, to the second device, a data packet that needs to be retransmitted. In this way, the data packet that needs to be retransmitted can be specified, thereby reducing resource waste.

Figure 5:
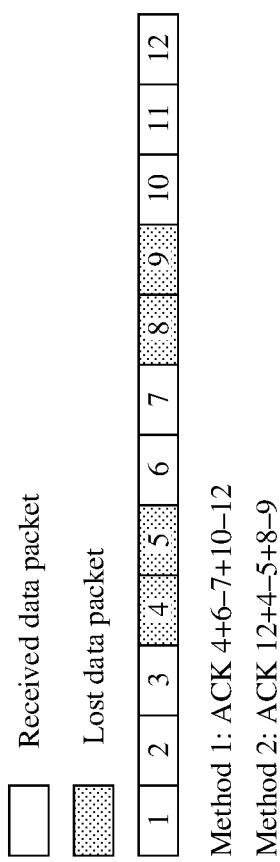
FIG. 5 is a schematic diagram of a case in which a large quantity of packets are lost in a data transmission process.

The following describes the two methods in detail with reference to FIG. 5. As shown in FIG. 5, the first device successfully receives number 1 to number 3 data packets, and number 4 and number 5 data packets are lost; then, the first device successfully receives number 6 and number 7 data packets, and number 8 and number 9 data packets are lost; and finally, the first device successfully receives number 10 to number 12 data packets.

In Method 1, key content of the acknowledgment packet replied by the first device to the second device is ACK 4+6-7+10-12. Herein, "ACK 4" indicates that an acknowledgment sequence number is 4 and that a sequence number of a next expected data packet of the second device is 4; "6-7+10-12" is a second field in an acknowledgment field, to indicate that the first device has successfully received the following number 6, number 7, number 10, number 11, and number 12 data packets although the first device has not been successfully received the number 4 data packet; and "6-7" and "10-12" are respectively a group of data packets. When the first device determines that retransmission of a lost packet needs to be performed (for example, receives three repeated acknowledgment packets), based on the acknowledgment sequence number and the content of the acknowledgment field, a transmit end abandons retransmission of the number 6 and number 7 data packets and the number 10 to number 12 data packets that have been considered to be successfully received, and relatively accurately retransmits in sequence the number 4 and number 5 data packets and the number 8 and number 9 data packets that may be lost.

In Method 2, key content of the acknowledgment packet replied by the first device to the second device is ACK 12+4-5+8-9. Herein, "ACK 12" indicates that a maximum sequence number of data packets that have been successfully received by the first device is 12; "4-5+8-9" indicates that number 4 and number 5 data packets and number 8 and number 9 data packets in all of number 1 to number 12 data packets are not successfully received although the maximum sequence number of the data packets that have been successfully received is 12. When the second device receives the acknowledgment packet, retransmission of lost packets is performed based on the sequence numbers of the data packets indicated in the acknowledgment packet.

The following describes the method in the embodiments of this application with more details with reference to specific examples.

It should be understood that the following examples are merely intended to help a person skilled in the art understand the embodiments of this application, instead of limiting the embodiments of this application to a specific value or a specific scenario shown in the examples. A person skilled in the art can apparently make various equivalent modifications or changes according to the examples described above, and such modifications or changes also fall within the scope of the embodiments of this application.

A method for constructing the acknowledgment field of the acknowledgment packet in this application is as follows:

a type (1 byte)+a total quantity of consecutive data sequence ranges (4 bits)+a quantity of bytes occupied by each consecutive data sequence range (4 bits)+a sequence number of a start byte (4 bytes)+a data length (1 byte: 256, or 2 bytes: 65535, . . . ).

Herein, the type may correspond to the third field in the foregoing, the total quantity of consecutive data sequence ranges may correspond to the value of K in the foregoing, the quantity of bytes occupied by each consecutive data sequence range may correspond to the second byte quantity in the foregoing, the sequence number of the start byte may correspond to the sequence number of the start byte in the foregoing, and the data length may correspond to the length in the foregoing.

The quantity of bytes occupied by the data length part changes with a current maximum consecutive data sequence range, and the quantity of bytes may be 4 bytes at most; "1 byte: 256" means that when a length of the consecutive data sequence range is less than 256, the quantity of bytes occupied by the data length is 1 byte; similarly, "2 bytes: 65535" indicates that when a length of the consecutive data sequence range is greater than 256 and less than or equal to 65535, the quantity of bytes occupied by the data length is 2 bytes; and the same case applies to a larger "consecutive data sequence range".

In the foregoing technical solution, an occupied length and content of a related part in the acknowledgment packet are dynamically adjusted based on length information of a consecutive received/lost data sequence range. When the consecutive data sequence range is small, the quantity of bytes occupied by the acknowledgment packet is reduced. When the consecutive data sequence range is large, the acknowledgment packet with more bytes is used for indication. To express the dynamically changing consecutive received/lost data sequence range, the quantity of bytes occupied by each consecutive data sequence range and the total quantity of consecutive data sequence ranges are further added in the acknowledgment packet in this application.

In the foregoing construction method, a total length occupied by the acknowledgment field may be optimized to $(2+L*N)$, where $5 \leq L \leq 8$. Herein, N is a total quantity of consecutive data sequence ranges, and a magnitude of L depends on the data length of the maximum consecutive data sequence range. In other words, a longer data length of the consecutive data range indicates a longer required data length and larger space occupied by the acknowledgment field.

In the method for constructing the acknowledgment field in this embodiment of this application, the total quantity of consecutive data sequence ranges and the quantity of bytes occupied by each consecutive data sequence range are separately indicated by using 4-bit space. For the total quantity of consecutive data sequence ranges, a maximum length of a TCP option in which the acknowledgment field is located is 40 bytes from which a 2-byte control field (a type field is 1 byte, and the total quantity of consecutive data sequence ranges and the bytes occupied by each consecutive data sequence range occupy 1 byte in total) is subtracted, and 38 bytes are left. In an example of a quantity of bytes occupied by a minimum consecutive data sequence range (for example, a sequence number 4 of a start byte+a data length 1=5), the total quantity of maximum consecutive data sequence ranges is 38/5=7. Therefore, 4-bit space is enough to be used to express the total quantity of consecutive data sequence ranges. For the quantity of bytes occupied by each consecutive data sequence range, a maximum value of a quantity of bytes occupied by a consecutive data sequence range is limited to 8 bytes. Therefore, 4-bit space is enough to express the quantity of bytes occupied by each consecutive data sequence range.

In this embodiment of this application, when each consecutive data sequence range is constructed, space required for expressing a maximum consecutive data sequence range is used. In this way, mistakenly parsing of the content of the acknowledgment packet caused due to magnitude inconsistency of consecutive data sequence ranges is avoided. A side effect of this method is possible space waste.

Another method for constructing an acknowledgment field is as follows:

a type (1 byte)+a length (1 byte)+a sequence number of a start byte (4 bytes)+a sequence number of an end byte (4 bytes).

Herein, the type is a type of an acknowledgment packet, the sequence number of the start byte is a sequence number of a start byte of a consecutive data sequence range, the sequence number of the end byte is a sequence number of an end byte of a consecutive data sequence range, and a group of the sequence number of the start byte and the sequence number of the end byte corresponds to a consecutive data sequence range.

In the foregoing construction method, a total length occupied by the acknowledgment field is $2+8*N$, where N is a total quantity of consecutive data sequence ranges. In the construction method, 8 bytes are fixedly used to indicate a consecutive data sequence range.

Results respectively obtained after the foregoing two methods for constructing an acknowledgment packet are used in an example in which an acknowledgment sequence number is 7778881 and a consecutive data sequence range is 7783261 to 7840201 are as follows:

In this application, the result is: ACK: 7778881+a type: *+a total quantity of consecutive data sequence ranges: 1+a quantity of bytes occupied by each consecutive data sequence range: 6+a sequence number of a start byte: 7783261+a data length: 56940, where * represents a new type number allocated for a new method for constructing an acknowledgment field.

In the other method, the result is: ACK: 7778881+a type: 5+a length: 10+a sequence number of a start byte: 7783261+a sequence number of an end byte: 7840201.

It may be learned that when the consecutive data sequence range is relative small, there is large space waste in using the other method due to very low expression efficiency. Due to tedious acknowledgment field content in the acknowledgment packet, the total quantity that is of consecutive data sequence ranges that are additionally received (lost) and that can be expressed in the acknowledgment packet is limited, and use of other function options in the acknowledgment packet is also limited. In an example of a TCP option field, a length of the TCP option field is limited to 40 bytes. In this method, at most four consecutive data sequence ranges ((40−2)/18=4.75) can be expressed. In addition, besides the acknowledgment field, other 33 function fields also use the TCP option field, while the tedious acknowledgment field content also limits use of these functions.

In comparison with the other method in which the acknowledgment field needs 10 bytes, in the method for constructing an acknowledgment field in this embodiment of this application, the acknowledgment field needs only 8 bytes.

More specifically, FIG. 6 shows two examples of respectively using the method according to an embodiment of this application and another method.

In a first example, a data length of a consecutive data sequence range exceeds 65535. Therefore, a data length field needs 3-byte space to express. In a second example, there are two consecutive data sequence ranges, and 6 bytes are needed to express each consecutive data sequence range. It may be learned that space occupied by an acknowledgment field in an acknowledgment packet can be effectively reduced in the method for constructing an acknowledgment field in this embodiment of this application.

Table 1 summarizes improvement in aspects of space saving and expression capability when an acknowledgment field constructed in the method in this application is compared with an acknowledgment field constructed in the another method, in a case in which the data length (DL) part in the acknowledgment field constructed in the method in this application increases as the data length of the consecutive data sequence range increases. In a first column, a quantity of bytes occupied by a data length is used as a standard to analyze a maximum value of a length of a single consecutive data sequence range that can be supported in different data lengths. The first column indicates the total quantity of supported consecutive data sequence ranges. It may be learned that the acknowledgment field constructed in the method of this application may support seven consecutive data sequence ranges at most, while the acknowledgment field constructed in the another method may support four consecutive data sequence ranges at most. The last column shows an average space saving rate in cases of different data lengths when the acknowledgment field constructed in the method of this application is compared with the acknowledgment field constructed in the another method.

It can be learned that by using the acknowledgment field constructed in the method in this application, the space occupied by acknowledgment packet information can be effectively reduced, and space usage of the acknowledgment packet can be improved, thereby reducing uplink bandwidth overheads.

TABLE 1

Effect comparison between an acknowledgment field of this application and an acknowledgment field of another method

|  | Another method (a data length occupies 4 bytes) | This application (a data length occupies 1 byte) | This application (a data length occupies 2 bytes) | This application (a data length occupies 3 bytes) | This application (a data length occupies 4 bytes) |
|---|---|---|---|---|---|
| One consecutive data sequence range | 10 bytes | 7 bytes | 8 bytes | 9 bytes | 10 bytes |
| Two consecutive data sequence ranges | 18 bytes | 12 bytes | 14 bytes | 16 bytes | 18 bytes |
| Three consecutive data sequence ranges | 26 bytes | 17 bytes | 20 bytes | 23 bytes | 26 bytes |
| Four consecutive data sequence ranges | 34 bytes | 22 bytes | 26 bytes | 30 bytes | 34 bytes |
| Five consecutive data sequence ranges | Cannot express | 27 bytes | 32 bytes | 37 bytes | Cannot express |
| Six consecutive data sequence ranges | Cannot express | 32 bytes | 38 bytes | Cannot express | Cannot express |
| Seven consecutive data sequence ranges | Cannot express | 37 bytes | Cannot express | Cannot express | Cannot express |
| Average saved space | N/A | 34.90% | 22.70% | 11.36% | 0% |

Figure 7:
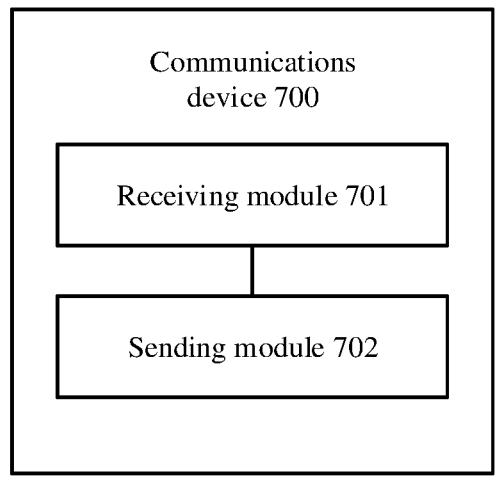
FIG. 7 is a schematic structural diagram of a communications device according to an embodiment of this application.

FIG. 7 is a structural block diagram of a communications device according to an embodiment of this application. The communications device 700 in FIG. 7 may correspond to the first device described above. As shown in FIG. 7, the communications apparatus 700 includes a receiving module 701 and a sending module 702.

The receiving module 701 is configured to receive data sent by a second device, where the data includes N data packets.

The sending module 702 is configured to send an acknowledgment packet to the second device, where the acknowledgment packet includes an acknowledgment field, the acknowledgment field includes a first field and a second field, the second field includes K locations and K lengths, an $i^{th}$ location in the K locations is a location of a start byte or a location of an end byte of an $i^{th}$ group of data packets in K groups of data packets, an $i^{th}$ length in the K lengths is a length of the $i^{th}$ group of data packets in the K groups of data packets, each group of data packets in the K groups of data packets include one data packet or a plurality of consecutive data packets, each group of data packets include one data packet or a plurality of consecutive data packets that belong to the N data packets, i=1, ..., K, and the first field is used to indicate a value of K.

The receiving module 701 may be implemented by a receiver. The sending module 702 may be implemented by a transmitter. For specific functions and beneficial effects of the receiving module 701 and the sending module 702, refer to the method shown in FIG. 3. Details are not described herein again.

Figure 8:
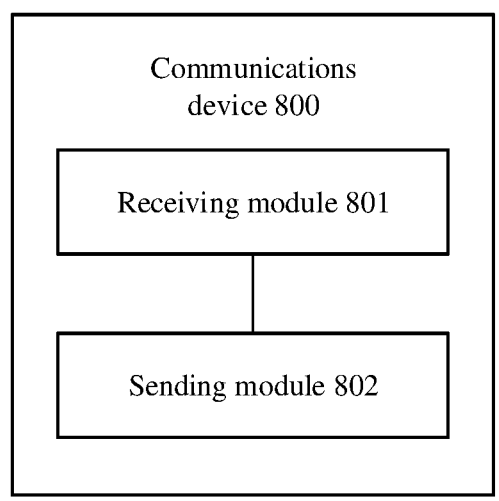
FIG. 8 is a schematic structural diagram of a communications device according to another embodiment of this application.

FIG. 8 is a structural block diagram of a communications device according to another embodiment of this application. The communications device 800 in FIG. 8 may correspond to the second device described above. As shown in FIG. 8, the communications apparatus 800 includes a receiving module 801 and a sending module 802.

The sending module 802 is configured to send data to a first device, where the data includes N data packets.

The receiving module 801 is configured to receive an acknowledgment packet sent by the first device, where the acknowledgment packet includes an acknowledgment field, the acknowledgment field includes a first field and a second field, the second field includes K locations and K lengths, an $i^{th}$ location in the K locations is a location of a start byte or a location of an end byte of an $i^{th}$ group of data packets in K groups of data packets, an $i^{th}$ length in the K lengths is a length of the $i^{th}$ group of data packets in the K groups of data packets, each group of data packets in the K groups of data packets include one data packet or a plurality of consecutive data packets, each group of data packets include one data packet or a plurality of consecutive data packets that belong to the N data packets, i=1, ..., K, and the first field is used to indicate a value of K.

The receiving module 801 may be implemented by a receiver. The sending module 802 may be implemented by a transmitter. For specific functions and beneficial effects of the receiving module 801 and the sending module 802, refer to the method shown in FIG. 3. Details are not described herein again.

Figure 9:
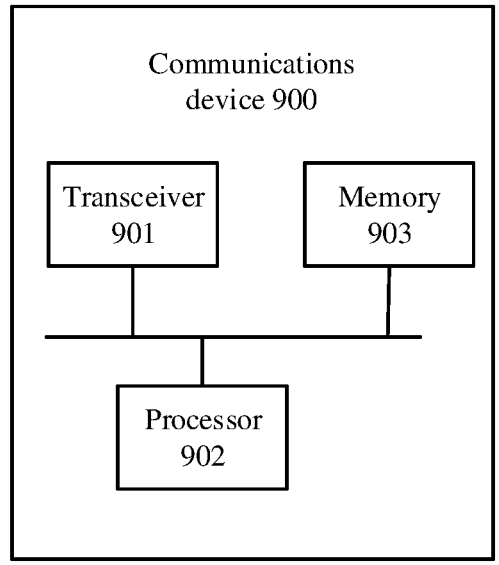
FIG. 9 is a schematic structural diagram of a communications device according to another embodiment of this application.

FIG. 9 is a schematic structural diagram of a communications device according to another embodiment of this application. The communications device 900 in FIG. 9 may correspond to the first device described above. As shown in FIG. 9, the communications device 900 includes a transceiver 901, a processor 902, and a memory 903.

FIG. 9 shows only one memory and one processor. In an actual communications device product, there may be one or more processors and one or more memories. The memory may also be referred to as a storage medium, a storage device, or the like. The memory may be disposed independent of the processor, or may be integrated with the processor. This is not limited in this embodiment of this application.

The transceiver 901, the processor 902, and the memory 903 communicate with each other through an internal connection path, to transmit a control signal and/or a data signal.

The methods disclosed in the foregoing embodiments of this application may be applied to the transceiver 901, or may be implemented by the transceiver 901.

Specifically, the transceiver 901 is configured to: receive data sent by a second device, where the data includes N data packets; and send an acknowledgment packet to the second device, where the acknowledgment packet includes an acknowledgment field, the acknowledgment field includes a first field and a second field, the second field includes K locations and K lengths, an $i^{th}$ location in the K locations is a location of a start byte or a location of an end byte of an $i^{th}$ group of data packets in K groups of data packets, an $i^{th}$ length in the K lengths is a length of the $i^{th}$ group of data packets in the K groups of data packets, each group of data packets in the K groups of data packets include one data packet or a plurality of consecutive data packets, each group of data packets include one data packet or a plurality of consecutive data packets that belong to the N data packets, i=1, ..., K, and the first field is used to indicate a value of K.

The acknowledgment packet may be generated by the processor 902 or a processing module in the transceiver 901.

For a specific working process and beneficial effects of the communications device 900, refer to the descriptions in the embodiment shown in FIG. 3.

Figure 10:
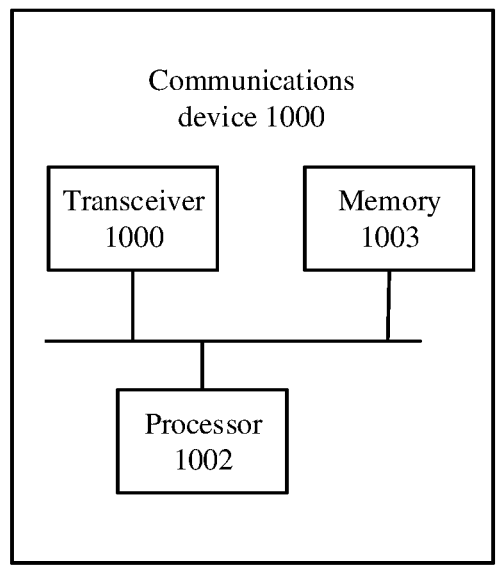
FIG. 10 is a schematic structural diagram of a communications device according to another embodiment of this application.

FIG. 10 is a schematic structural diagram of a communications device according to another embodiment of this application. The communications device 1000 in FIG. 10 may correspond to the second device described above. As shown in FIG. 10, the communications device 1000 may include a transceiver 1001, a processor 1002, and a memory 1003.

FIG. 10 shows only one memory and one processor. In an actual communications device product, there may be one or more processors and one or more memories. The memory may also be referred to as a storage medium, a storage device, or the like. The memory may be disposed independent of the processor, or may be integrated with the processor. This is not limited in this embodiment of this application.

The transceiver 1001, the processor 1002, and the memory 1003 communicate with each other through an internal connection path, to transmit a control signal and/or a data signal.

The methods disclosed in the foregoing embodiments of this application may be applied to the transceiver 1001, or may be implemented by the transceiver 1001. Specifically, the transceiver 1001 is configured to: send data to a first device, where the data includes N data packets; and receive an acknowledgment packet sent by the first device, where the acknowledgment packet includes an acknowledgment field, the acknowledgment field includes a first field and a second field, the second field includes K locations and K lengths, an $i^{th}$ location in the K locations is a location of a start byte or a location of an end byte of an $i^{th}$ group of data packets in K groups of data packets, an $i^{th}$ length in the K lengths is a length of the $i^{th}$ group of data packets in the K groups of data packets, each group of data packets in the K groups of data packets include one data packet or a plurality of consecutive data packets, each group of data packets include one data packet or a plurality of consecutive data packets that belong to the N data packets, i=1, ..., K, and the first field is used to indicate a value of K.

The acknowledgment packet may be parsed and processed by the processor 1002 or a processing module in the transceiver 1001.

For a specific working process and beneficial effects of the communications device 1000, refer to the descriptions in the embodiment shown in FIG. 3.

The transceiver described in the embodiments of this application may also be referred to as a transceiver unit, a transceiver, a transceiver apparatus, or the like. The processor may also be referred to as a processing unit, a processing board, a processing module, a processing apparatus, or the like. Optionally, a component that is in the transceiver and that is configured to implement a receiving function may be considered as a receiving unit, and a component that is in the transceiver and that is configured to implement a sending function may be considered as a sending unit. In other words, the transceiver unit includes the receiving unit and the sending unit. The receiving unit sometimes may also be referred to as a receiver machine, a receiver, a receiving circuit, or the like. The sending unit sometimes may also be referred to as a transmitter machine, a transmitter, a transmitter circuit, or the like.

The memory in the embodiments of this application is configured to store a computer instruction and a parameter that are required for running the processor.

The processor in the embodiments of this application may be an integrated circuit chip and has a signal processing capability. In an implementation process, steps in the foregoing methods can be implemented by using a hardware integrated logical circuit in the processor, or by using instructions in a form of software. The processor in the embodiments of this application may be a general purpose processor, a digital signal processor (DSP), an application-specific integrated circuit (ASIC), a field programmable gate array (FPGA) or another programmable logic device, a discrete gate or transistor logic device, or a discrete hardware component. It may implement or perform the methods, the steps, and logical block diagrams that are disclosed in the embodiments of this application. The general purpose processor may be a microprocessor, or the processor may be any conventional processor or the like. Steps of the methods disclosed with reference to the embodiments of this application may be directly executed and accomplished by using a hardware decoding processor, or may be executed and accomplished by using a combination of hardware and software modules in the decoding processor. A software module may be located in a mature storage medium in the art, such as a random access memory (RAM), a flash memory, a read-only memory (ROM), a programmable read-only memory, an electrically erasable programmable memory, a register, or the like. The storage medium is located in the memory, and a processor reads instructions in the memory and completes the steps in the foregoing methods in combination with hardware of the processor.

In the embodiments of this application, sequence numbers of the foregoing processes do not mean execution sequences in various embodiments of this application. The execution sequences of the processes should be determined based on functions and internal logic of the processes, and should not be construed as any limitation on the implementation processes of the embodiments of this application.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer program instructions are loaded and executed on the computer, the procedure or functions according to the embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital video disc (DVD)), a semiconductor medium (for example, a solid-state drive (SSD)), or the like.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that such an implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of this application. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method, comprising:
   receiving, by a first device, data sent by a second device, wherein the data comprises N data packets; and
   sending, by the first device, an acknowledgment packet to the second device, wherein the acknowledgment packet comprises an acknowledgment field, the acknowledgment field comprises a first field and a second field, the second field comprises information of K locations and K lengths, and wherein:
   for each integer value of i from 1 to K, an $i^{th}$ location in the K locations is a location of a start byte or a location of an end byte of an $i^{th}$ group of data packets in K groups of data packets, an $i^{th}$ length in the K lengths is a length of the $i^{th}$ group of data packets in the K groups of data packets; and
   each group of data packets in the K groups of data packets comprises one data packet or a plurality of consecutive data packets that belong to the N data packets, and the first field indicates a value of K and instructs the second device to correctly parse the acknowledgment field.

2. The method according to claim 1, wherein each location of the start byte is a sequence number of a start data packet or a sequence number of the start byte, and each location of the end byte is a sequence number of an end data packet or a sequence number of the end byte.

3. The method according to claim 2, wherein each length is a sequence number offset relative to the start data packet or the end data packet corresponding to a respective length, or a sequence number offset relative to the start byte or the end byte corresponding to the respective length.

4. The method according to claim 1, wherein the first field comprises the value of K.

5. The method according to claim 1, wherein the first field comprises a first byte quantity, and the first byte quantity is a quantity of bytes occupied by the acknowledgment field.

6. The method according to claim 5, wherein the first field further comprises a second byte quantity, and the second byte quantity is a quantity of bytes occupied to indicate a length of the K lengths.

7. The method according to claim 5, wherein the first field further comprises a second byte quantity, and the second byte quantity is a quantity of bytes occupied to indicate both a location of the K locations and a length of the K lengths.

8. The method according to claim 7, wherein the quantity of bytes occupied to indicate a length of the K lengths is a quantity of bytes occupied to indicate a maximum length of the K lengths.

9. The method according to claim 1, wherein the acknowledgment field further comprises a third field, and the third field indicates a type of the acknowledgment field.

10. The method according to claim 1, wherein the K groups of data packets are K groups of data packets that are successfully received.

11. The method according to claim 1, wherein the K groups of data packets are K groups of data packets that are not successfully received.

12. A device, comprising:
    a transceiver;
    a processor;
    a non-transitory computer readable storage medium storing a program that is executable by the processor, the program comprising instructions for:
    receiving, using the transceiver, data sent by a second device, wherein the data comprises N data packets; and
    sending, using the transceiver, an acknowledgment packet to the second device, wherein the acknowledgment packet comprises an acknowledgment field, the acknowledgment field comprises a first field and a second field, the second field comprises information of K locations and K lengths, and wherein:
    for each integer value of i from 1 to K, an $i^{th}$ location in the K locations is a location of a start byte or a location of an end byte of an $i^{th}$ group of data packets in K groups of data packets, an $i^{th}$ length in the K lengths is a length of the $i^{th}$ group of data packets in the K groups of data packets; and
    each group of data packets in the K groups of data packets comprises one data packet or a plurality of consecutive data packets that belong to the N data packets, and the first field indicates a value of K and instructs the second device to correctly parse the acknowledgment field.

13. The device according to claim 12, wherein each location of the start byte is a sequence number of a start data packet or a sequence number of the start byte, and each location of the end byte is a sequence number of an end data packet or a sequence number of the end byte.

14. The device according to claim 13, wherein each length is a sequence number offset relative to the start data packet or the end data packet corresponding to a respective length, or a sequence number offset relative to the start byte or the end byte corresponding to the respective length.

15. The device according to claim 12, wherein the first field comprises the value of K.

16. The device according to claim 12, wherein the first field comprises a first byte quantity, and the first byte quantity is a quantity of bytes occupied by the acknowledgment field.

17. The device according to claim 16, wherein the first field further comprises a second byte quantity, and the second byte quantity is a quantity of bytes occupied to indicate a length of the K lengths.

18. The device according to claim 16, wherein the first field further comprises a second byte quantity, and the second byte quantity is a quantity of bytes occupied to indicate both a location of the K locations and a length of the K lengths.

19. The device according to claim 18, wherein the quantity of bytes occupied to indicate a length of the K lengths is a quantity of bytes occupied to indicate a maximum length of the K lengths.

20. A non-transitory computer readable storage medium storing a program comprising instructions, the instructions including instructions for:
    receiving data sent by a second device, wherein the data comprises N data packets; and
    sending an acknowledgment packet to the second device, wherein the acknowledgment packet comprises an acknowledgment field, the acknowledgment field comprises a first field and a second field, the second field comprises information of K locations and K lengths, and wherein:

for each integer value of i from 1 to K, an $i^{th}$ location in the K locations is a location of a start byte or a location of an end byte of an $i^{th}$ group of data packets in K groups of data packets, an $i^{th}$ length in the K lengths is a length of the $i^{th}$ group of data packets in the K groups of data packets; and each group of data packets in the K groups of data packets comprises one data packet or a plurality of consecutive data packets that belong to the N data packets, and the first field indicates a value of K and instructs the second device to correctly parse the acknowledgment field.

* * * * *